US008693399B2

(12) United States Patent
Hirata et al.

(10) Patent No.: US 8,693,399 B2
(45) Date of Patent: Apr. 8, 2014

(54) GATEWAY APPARATUS, NODE APPARATUS, COMMUNICATION SYSTEM, AND CHANNEL SWITCHING METHOD

(75) Inventors: Shinichi Hirata, Kawasaki (JP); Jun Hasegawa, Akashi (JP); Takahiro Koharagi, Tokyo (JP); Takuji Furusawa, Tokyo (JP); Hiroaki Kawasumi, Tokyo (JP); Masashi Kuwahara, Fukushima (JP); Katsumi Kobayashi, Tokyo (JP); Masaharu Nozawa, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 13/484,929

(22) Filed: May 31, 2012

(65) Prior Publication Data

US 2012/0307752 A1  Dec. 6, 2012

(30) Foreign Application Priority Data

Jun. 1, 2011  (JP) .................................. 2011-123564

(51) Int. Cl.
   *H04W 4/00* (2009.01)
(52) U.S. Cl.
   USPC ........................................................ 370/328
(58) Field of Classification Search
   USPC .................................................. 370/328–339
   See application file for complete search history.

(56) References Cited

U.S. PATENT DOCUMENTS

| 7,522,551 | B2* | 4/2009 | Giaimo et al. ................. 370/328 |
| 7,933,247 | B2* | 4/2011 | Gidwani ........................ 370/332 |
| 8,060,017 | B2* | 11/2011 | Schlicht et al. ............... 455/41.2 |
| 2006/0019673 | A1 | 1/2006 | Yagyu et al. |
| 2006/0121854 | A1 | 6/2006 | Abhishek et al. |
| 2007/0076673 | A1* | 4/2007 | Joshi .............................. 370/338 |

FOREIGN PATENT DOCUMENTS

| JP | 2006-50549 | 2/2006 |
| JP | 2006-186992 | 7/2006 |
| JP | 2010-34974 | 2/2010 |
| JP | 2010-141394 | 6/2010 |

OTHER PUBLICATIONS

Amir Qayyum et al., "Multipoint Relaying for Flooding Broadcast Messages in Mobile Wireless Networks", Proceedings of the 35th Hawaii International Confer-ence on System Sciences, Jan. 2002, pp. 1-10.
Sze-Yao Ni et al., "The Broadcast Storm Problem in a Mobile Ad Hoc Network", Proceedings of the Fifth Annual ACM/IEEE International Conference on Mobile Computing and Networking, Aug. 1999, pp. 151-162.

* cited by examiner

*Primary Examiner* — Frank Duong
(74) *Attorney, Agent, or Firm* — Staas & Halsey LLP

(57) ABSTRACT

A gateway apparatus including: a route control packet generating unit that generates a route control packet for constructing routes between node apparatuses forming an ad hoc network and the gateway apparatus; a channel designation signal generating unit that generates channel designation signal for designating a second channel different from a first channel on which the ad hoc network transmits and receives packets; a time designation signal generating unit that generates time designation signal for designating switching time to the node apparatus for switching the channel used for transmission and reception of packets to the second channel; a radio communication unit that transmits the route control packet, the channel designation signal and the time designation signal on the first channel; and a channel switching unit that switches, when it is time to switch, the channel on which the radio communication unit transmits and receives a signal to the second channel.

6 Claims, 16 Drawing Sheets

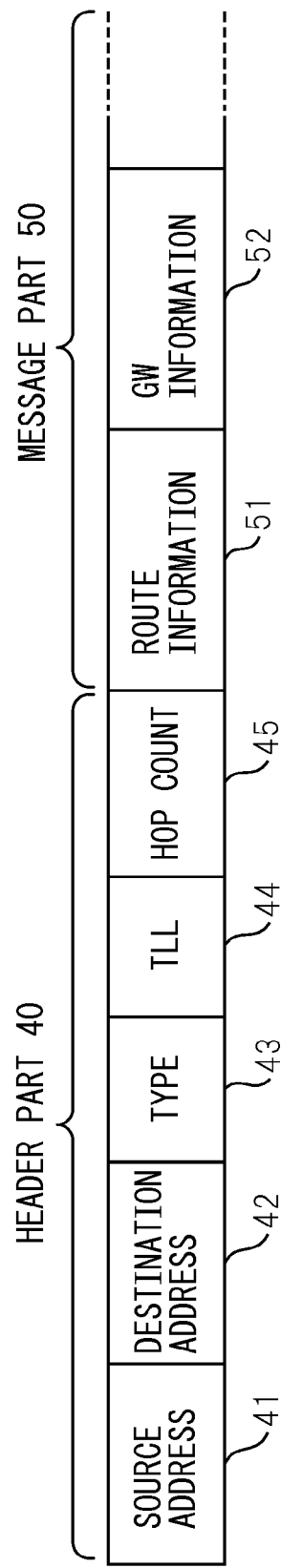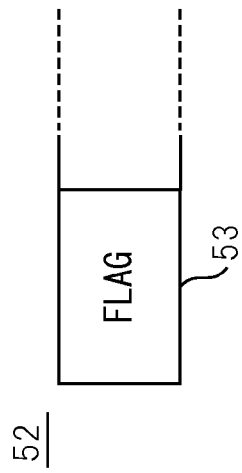

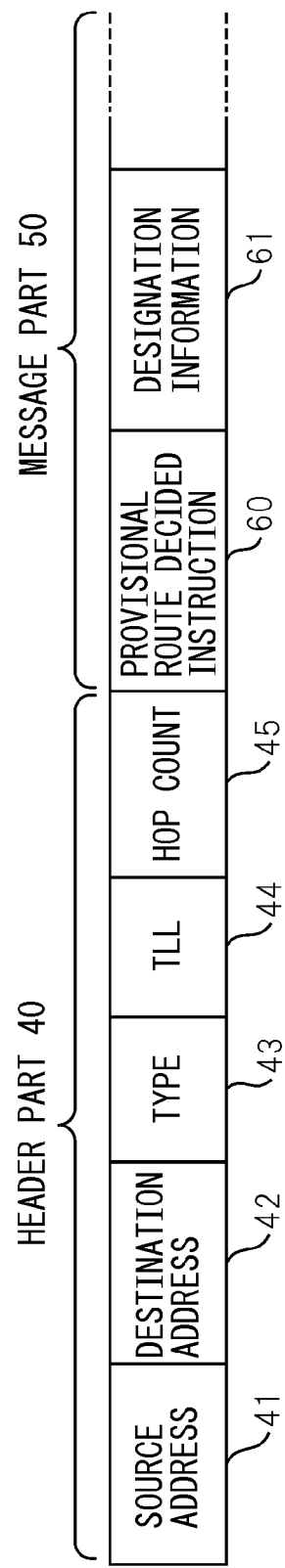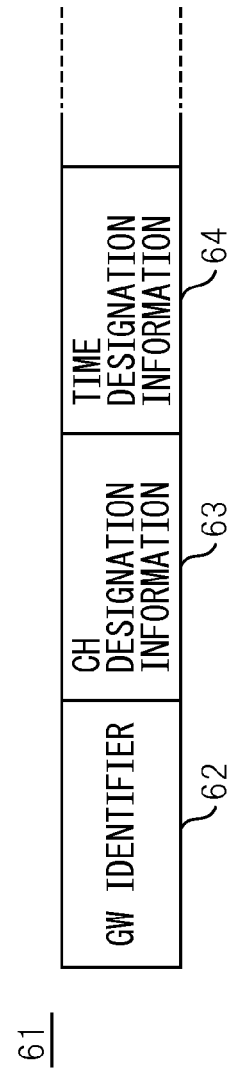

GATEWAY APPARATUS, NODE APPARATUS, COMMUNICATION SYSTEM, AND CHANNEL SWITCHING METHOD

CROSS-REFERENCE TO RELATED APPLICATIONS

This application is based upon and claims the benefit of priority of the prior Japanese Patent Application No. 2011-123564, filed on Jun. 1, 2011, the entire contents of which are incorporated herein by reference.

The embodiments described in the present specification relate to a wireless ad hoc network.

A communication system which relays a wireless ad hoc network and other networks by gateway apparatuses is known. As a technology relating to such a communication system, a method has been proposed for adding a gateway apparatus to the system in the situation that communication routes connecting a plurality of radio nodes are constructed with a gateway apparatus as the origin. In this method, the gateway apparatus broadcasts and transmits a group construction message for constructing a new communication route, and each radio node stores the number of relay stages with the gateway apparatus. Each wireless node joins the communication route of the gateway apparatus if the number of relay stages with the gateway apparatus indicated in the group construction message is smaller than the number of relay stages with the gateway apparatus when it receives the group construction message. The number of relay stages of the group construction message is incremented, and the message is broadcasted and transmitted to another wireless node, and the group construction message is successively propagated among the wireless nodes.

As another related technology, a method is known in which a communication device in an ad hoc network using a first communication band transmits a state signal indicating a link state of its own device for the ad hoc network to other communication device of the ad hoc network by a communication using a second communication band different from the first communication band, and receives a switching instruction signal containing an instruction to switch the communication channel in the ad hoc network from other communication device by the communication using the second communication band, and switches the channel of its own device in the ad hoc network based on the switching instruction signal.

Also, a method is known for dynamically allocating channels of a plurality of interfaces in response to a traffic condition within each access point constituting a mesh network. This method includes a process of acquiring information on its own access point in a node, and a process of grouping access points having large traffic into a cluster having same channel set based on acquired information.

Also, in order to reduce interference-related problem in a wireless network, a method of using a separate control channel has been proposed. This method includes transmitting content data in main data channel in unlicensed band in a wireless network, receiving control data on control channel different from the main data channel, and changing at least one parameter corresponding to further transmission on the main data channel based on control data, wherein the control data include information for managing transmission of content data on the main data channel.

Related art is disclosed in Japanese Laid-open Patent Publications No. 2010-141394, No. 2010-34974, No. 2006-50549, and No. 2006-186992. Related art is also disclosed in "Multipoint Relaying for FloodingBroadcast Message in Mobile Wireless Networks", A. Qayyum, L. Yiennot, and A. Laouiti:, Proc. 35th Hawaii Int'l Conf, System Sciences (HICSS-35), pp. 3898-3907, January, 2002, and "The Broadcast Storm Problem in a Mobile Ad Hoc Network", Ni, S., Tseng, Y., Chen, Y., Sheu, J.:, Proc. of 4th International Conference on Mobile Computing and Networking, pp. 151-162 (1999).

SUMMARY

In accordance with an aspect of the apparatus, there is provided a gateway apparatus connecting an ad hoc network to other network. The gateway apparatus includes a route control packet generating unit for generating a route control packet for route control in order to construct a route forming an ad hoc network between a node apparatus and a gateway apparatus, a channel designation signal generating unit for generating channel designation signal designating a second channel different from a first channel for the ad hoc network to transmit and receive packets, a time designation signal generating unit for generating time designation signal designating the switching tine for switching the channel being used for transmission and reception of packets to the second channel for node apparatuses forming the ad hoc network, a radio communication unit for transmitting the route control packet, the channel designation signal and the time designation signal on the first channel, and a channel switching unit that switches, when it is time to switch, the channel being used for transmission and reception of signal to the second channel.

In accordance with another aspect of the apparatus, there is provided a node apparatus for forming an ad hoc network. The node apparatus includes a radio communication unit capable of switching the channel used for transmission and reception of packets, a route control unit that transmits and receives via the radio communication unit the route control packets for route control transmitted through the ad hoc network to which the node apparatus belongs in order to construct route between a second gateway apparatus different from a first gateway apparatus connected to the ad hoc network and the node apparatus for forming the ad hoc network, a designating information acquisition unit that acquires designation information on a second channel different from a first channel used by the ad hoc network to transmit and receive packets and on the channel switching time from a channel designation signal as well as a time designation signal transmitted through the ad hoc network and received by the radio communication unit, a selection unit for selecting either one of the first gateway apparatus and the second gateway apparatus, and a channel control unit that switches, when the selection unit selects the second gateway apparatus and when it is tome to switch, the channel being used by the radio communication unit to transmit and receive signal to the second channel.

In accordance with an aspect of the method, there is provided a channel switching method for a node apparatus for forming an ad hoc network. The method includes transmitting route control packets for route control in order to construct a route between a second gateway apparatus different from a first gateway apparatus connected to the ad hoc network and a node apparatus forming the ad hoc network through the ad hoc network transmitting and receiving packets on the first channel, transmitting a channel designation signal for designating a second channel different from a first channel and a time designation signal for designating channel switching time through the ad hoc network, selecting, for each node apparatus receiving the route control packet, either one of the first gateway apparatus and the second gateway apparatus, and switching, when it is time to switch, the channel used by the node apparatus selecting the second gateway apparatus for transmitting and receiving packets to the second channel.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5A is a view useful for illustrating an example of the construction of a route control packet for a provisional route;

FIG. 5B is a view useful for illustrating an example of the gateway information;

FIG. 6A is view useful for illustrating an example of the construction of a decided instruction packet;

FIG. 6B is view useful for illustrating an example of the construction of a decided instruction packet;

DESCRIPTION OF EMBODIMENTS

A system configuration in which a plurality of wireless ad hoc networks transmit and receive packets to and from each other on mutually different frequency channels and each wireless ad hoc network is connected individually to respective gateway apparatus is supposed. A wireless ad hoc network is hereinafter denoted simply as "ad hoc network". Also, a frequency channel is simply denoted as "channel".

In order to relieve burden on a wireless resource due to increase of the number of nodes, a gateway apparatus may be added that uses a channel different from the channel being used. Since existing node apparatuses move to the new ad hoc network formed by the added gateway apparatus, burden on the wireless resource in existing channel can be relieved.

When a new network is formed, route control packets are transmitted to node apparatuses of existing network to thereby determine the range of node apparatuses that belong to the newly formed network.

During this processing, if the channel being used by the node apparatus is switched to the channel used by the newly added gateway apparatus (i.e., the channel to be used by the new network), the node apparatus is unable to communicate with the gateway apparatus connected to existing network. As a result, communication may be temporarily disconnected.

If the node apparatus has a plurality of radio interfaces, the node apparatus can exchange route control packets on the channel used in the new network while maintaining communication with existing network. However, provision of a plurality of radio interfaces increases manufacturing cost of the node apparatus as well as power consumption.

It is an object of the apparatus and method disclosed in this specification to reduce, when a gateway apparatus using a different channel is added to existing ad hoc network, the possibility of disconnection of communication that may occur in a node apparatus not provided with a plurality of radio interfaces at the time of adding a new gateway apparatus.

1. Construction of Communication System

Figure 1:
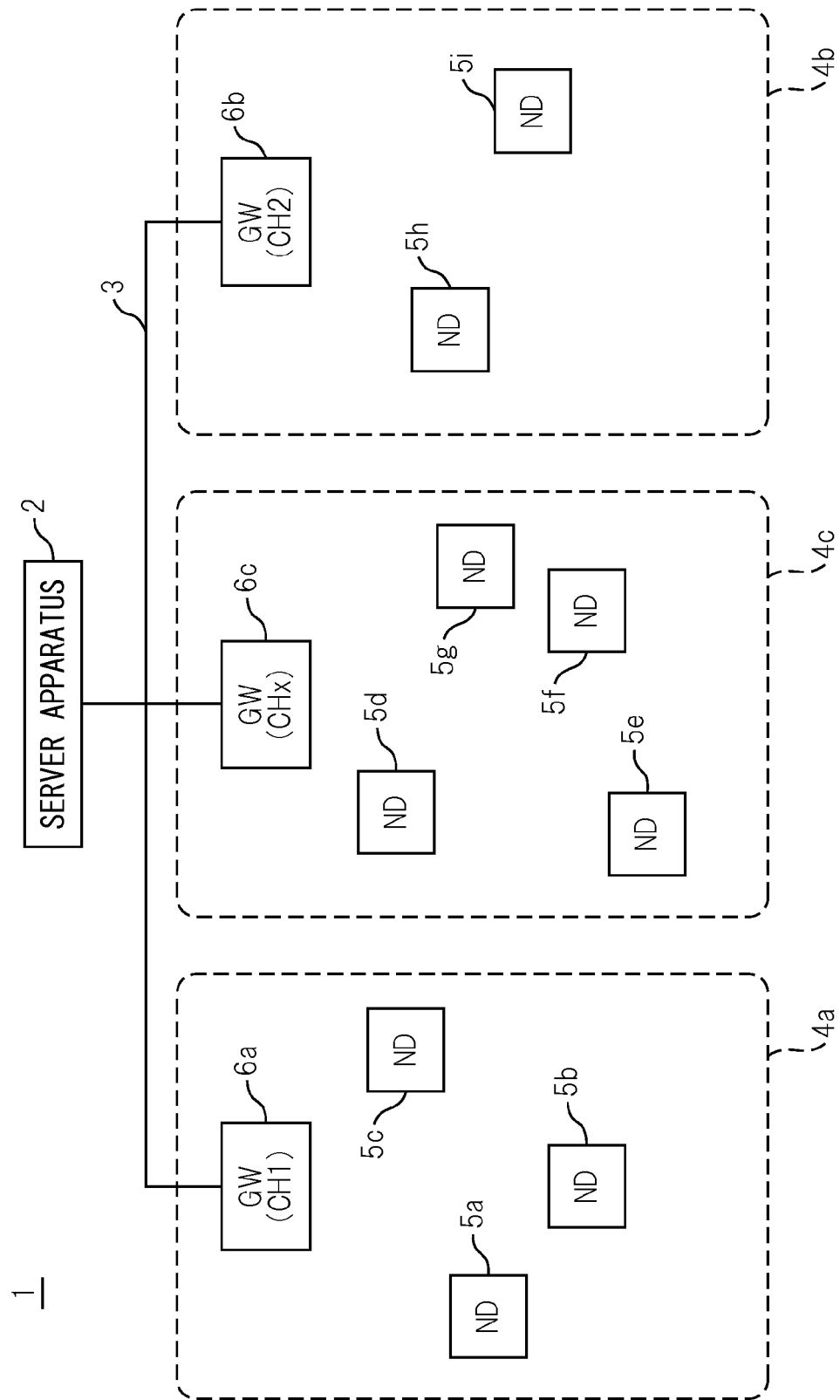
FIG. 1 is a view depicting an exemplary overall construction of a communication system.

The present invention will be illustrated with reference to appended drawings depicting preferred examples thereof. FIG. 1 is a view depicting an exemplary overall construction of a communication system. The communication system 1 includes a server apparatus 2, ad hoc networks 4a~4c, and gateway apparatuses 6a~6C. The ad hoc network 4a is formed from a plurality of node apparatuses 5a~5c. Similarly, the ad hoc networks 4b and 4c are formed from node apparatuses 5h and 5i, and 5d~5g, respectively.

In appended drawings, the gateway apparatus may be denoted as "GW", and the node apparatuses may be denoted as "ND". In the description that follows, the ad hoc networks 4a~4c may be collectively denoted as "ad hoc network 4", and gateway apparatuses 6a~6C may be collectively denoted as "gateway apparatus 6". Also, the node apparatuses 5a~5i may be collectively denoted as "node apparatus 5".

The communication system 1 may be, for example, a data collection system in which a server apparatus 2 collects meter reading data such as power, gas and water consumption acquired by the node apparatus 5 through the gateway apparatus 6.

The server apparatus 2 and the gateway apparatus 6 are connected to a communication network 3, with the gateway apparatus 6 relaying between the communication network 3 and the ad hoc network 4. The communication network 3 is a network that provides communication function between the server apparatus 2 and the gateway apparatus 6, in which a network using various protocols and communication media may be utilized.

The communication system 1 includes a plurality of gateway apparatuses 6a~6c. The gateway apparatus 6a relays between the ad hoc network 4a and the communication network 3. Similarly, the gateway apparatuses 6b and 6c respectively relay between the ad hoc network 4b and the communication network 3 and between the ad hoc network 4c and the communication network 3. The gateway apparatus 6a~6c perform communication on channels different from each other. That is, the gateway apparatuses 6a~6c transmit and receive packets on channels different from each other. In the example depicted in FIG. 1, the gateway apparatus 6a, 6b and 6c use the channels CH1, CH2 and CHx. Therefore, the ad hoc network 4a, 4b and 4c use the channels CH1, CH2 and CHx to perform communication.

Figure 2A:
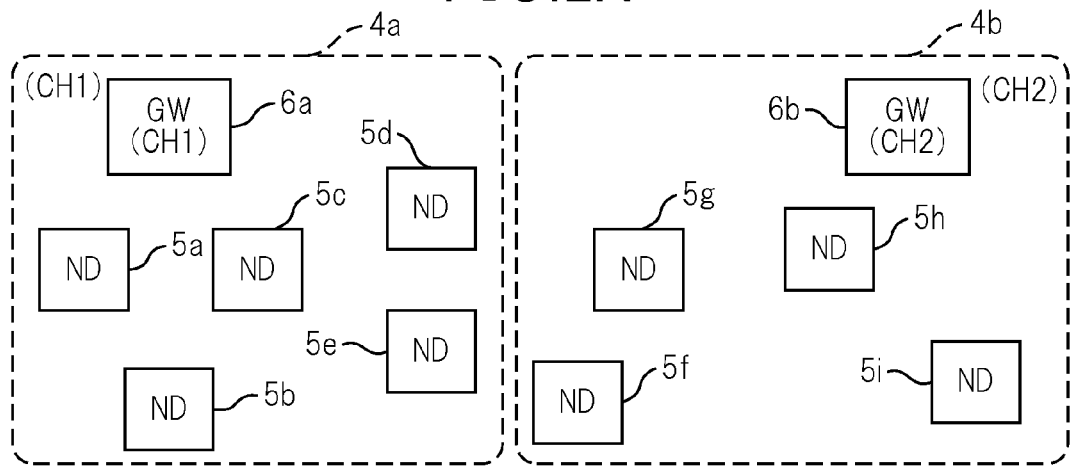
FIG. 2A is view useful for illustrating change of a network when adding a gateway apparatus.
Figure 2B:
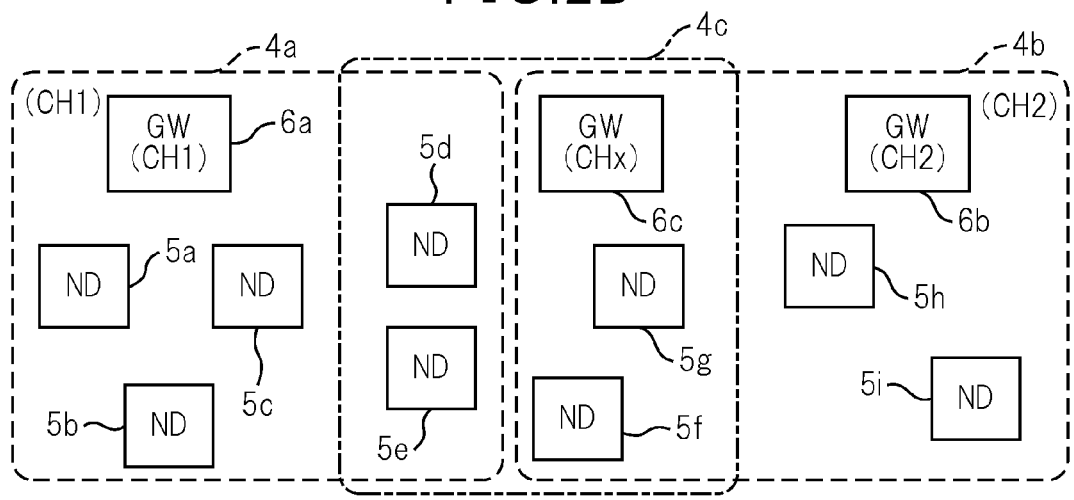
FIG. 2B is view useful for illustrating change of a network when adding a gateway apparatus.
Figure 2C:
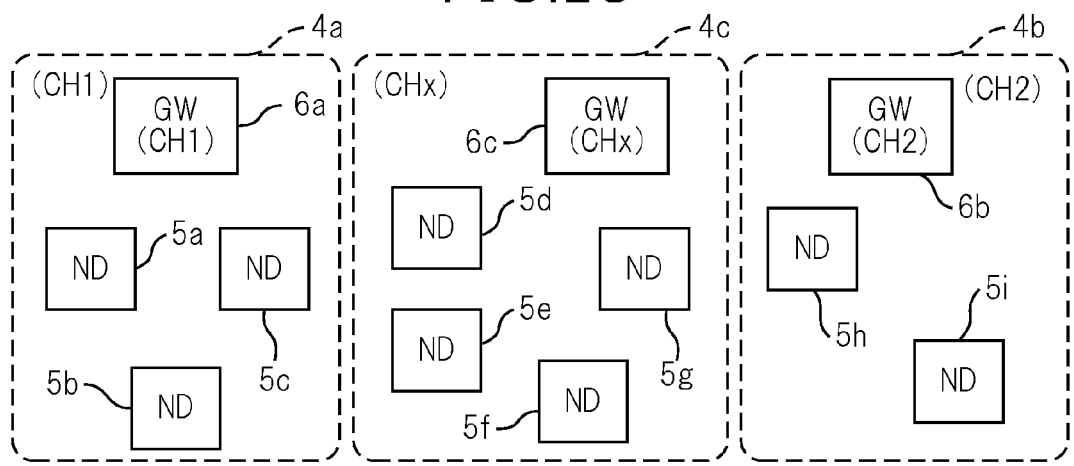
FIG. 2C is view useful for illustrating change of a network when adding a gateway apparatus.

As described above, a gateway apparatus that uses a channel different from the channels being used may be added to form a new ad hoc network. Change of the network when a gateway apparatus is added will be described below. FIG. 2A to FIG. 2C are views useful for illustrating change of the network when a gateway apparatus is added.

FIG. 2A is a view depicting the state in which only gateway apparatuses 6a and 6b are provided. The ad hoc network 4a formed of the node apparatuses 5a~5e is connected to the gateway apparatus 6a. The gateway apparatus 6a and the ad hoc network 4a perform communication on the channel CH1. The ad hoc network 4b formed of node apparatuses 5f~5i is connected to the gateway apparatus 6b. The gateway apparatus 6b and the ad hoc network 4b perform communication on the channel CH2.

FIG. 2B is a view depicting the state in which a new gateway apparatus 6C is added. The gateway apparatus 6c is a gateway apparatus that performs communication by using a channel CHx different from the channels CH1 and CH2. With the added gateway apparatus 6c, a new ad hoc network 4c is formed which performs communication on the channel CHx. Since some of the node apparatuses 5a~5i forming the ad hoc network 4a and 4b are moved to the ad hoc network 4c, the burden on the ad hoc network 4a and 4b is relieved.

The gateway apparatus 6c disclosed in the present specification transmits route control packets to node apparatuses 5 for constructing routes between the gateway apparatus 6c and the node apparatuses 5 in order to determine the range of the node apparatuses 5 that are moved to the ad hoc network 4c. In the present specification, the route that is constructed between the gateway apparatus 6c and a node apparatus 5, when determining the range of the node apparatuses 5 which will belong to the ad hoc network 4c communicating on the channel CHx used by the newly added gateway apparatus 6c, is denoted as "provisional route".

The route control packet for route control in order to construct provisional routes may be denoted as "route control packet for provisional route". Format of a route control packet for provisional route may be same format as the route control packet in accordance with any of various route control protocols used for forming ad hoc network.

The gateway apparatus 6c transmits the route control packets for provisional route on the channel CH1 so that the node apparatuses 5a~5e constituting the ad hoc network 4a can exchange route control packet for provisional route while maintaining existing communication. The route control packet for provisional route may contain a prescribed flag in order to distinguish it from a route control packet for route control in the ad hoc network 4a. Next, the gateway apparatus 6c transmits the route control packets for provisional route on the channel CH2 so that the node apparatuses 5f~5i constituting the ad hoc network 4b also can exchange route control packet for provisional route.

The node apparatuses 5a~5i that have received the route control packet for provisional route select either one of more favorable condition, between the gateway apparatus 6 to which the ad hoc network it presently belongs to is connected and the new gateway apparatus 6c. The node apparatus 5 that selects the gateway apparatus 6c switches, at designated switching time, the channel used to the channel CHx in synchronized manner with the gateway apparatus 6c. This state is depicted in FIG. 2C.

FIG. 2C depicts the state in which the node apparatus 5d~5g select the gateway apparatus 6c. Thereafter, the route control packets are exchanged between the gateway apparatus 6c and the node apparatuses 5d~5g for constructing the route to thereby construct the ad hoc network 4c.

2. First Embodiment

<2-1. Gateway Apparatus>

Figure 3:
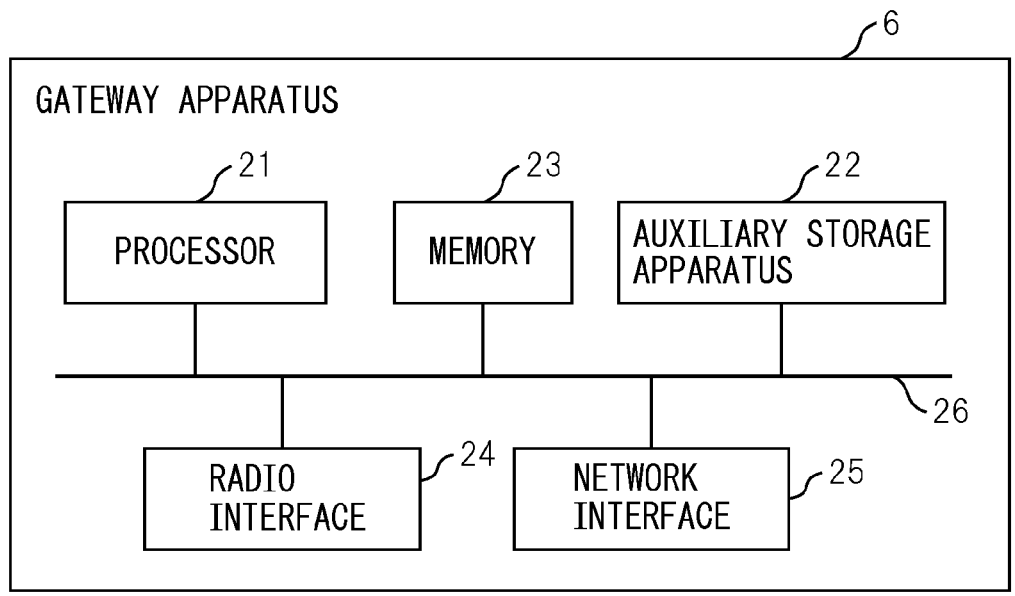
FIG. 3 is a view depicting an example of the hardware construction of a gateway apparatus.

Next, the construction and function of the gateway apparatus 6 and the node apparatus 5 in each embodiment will be described. FIG. 3 is a view depicting an example of the hardware construction of the gateway apparatus 6. The gateway apparatus 6 includes a processor 21, an auxiliary storage device 22, a memory 23, a radio interface 24, a network interface 25 and a data bus 26.

The processor 21, by executing the control program stored in the auxiliary storage device 22, performs various processing for controlling operation of the gateway apparatus 6, and following processing for route control by the gateway apparatus 6 and channel switching by the node apparatus 5. In the auxiliary storage device 22, the control program for causing the processor 21 to execute above-described processing is stored. The auxiliary storage device 22 may include a non-volatile memory, a read-only-memory (ROM), and storage device such as a hard disk.

The memory 23 stores a program being executed by the processor 21, and data temporarily used by this program. The memory 23 may include a random access memory (RAM). The radio interface 24 performs radio communication processing with the node apparatus 5. The channel used by the radio interface 24 for transmission and reception of signal is selected from a plurality of channels by the processor 21 executing the processing as described below. The network interface 25 performs communication processing with the communication network 3, and enables transmission and reception of signal to and from the server apparatus 2. Above-described constituents 21~25 are electrically connected by the data bus 26.

Figure 4:
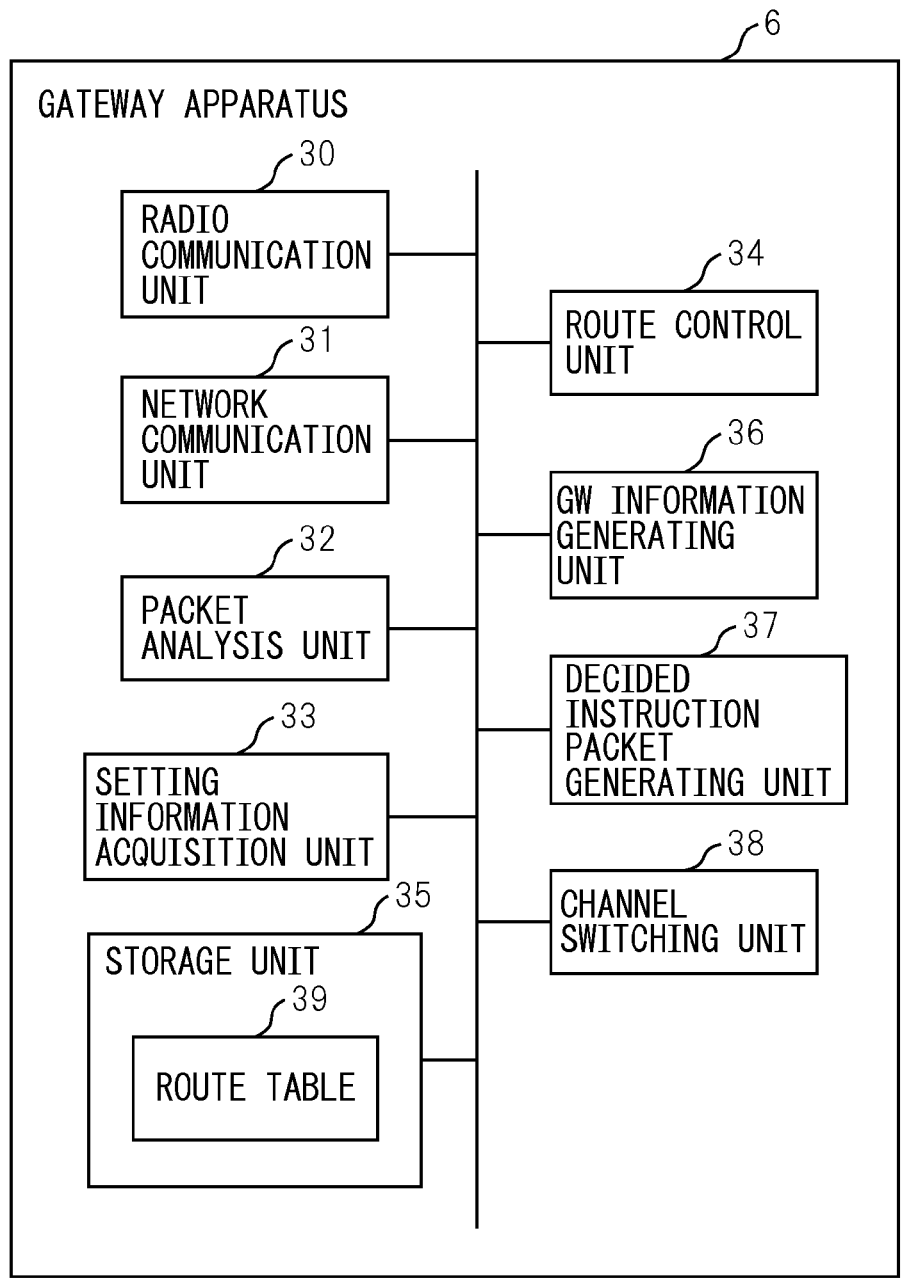
FIG. 4 is a view depicting an example of the construction of a gateway apparatus.

FIG. 4 is a view depicting an example of the construction of the gateway apparatus 6. The processor 21 of FIG. 3 performs information processing by the constituents of the gateway apparatus 6 as depicted in FIG. 4 in accordance with the program stored in the auxiliary storage device 22 and in cooperation with other hardware elements of the gateway apparatus 6 as required. FIG. 4 illustrates mainly the functions related to following description.

The gateway apparatus 6 includes a radio communication unit 30, a network communication unit 31, a packet analysis unit 32, a setting information acquisition unit 33, a route control unit 34, a storage unit 35, a gateway information generating unit 36, a decided instruction generating unit 37 and a channel switching unit 38.

The radio communication unit 30 transmits a radio packet in unicast format or broadcast format through the radio interface 24 to the node apparatus 5. The radio communication unit 30 also receives a radio packet transmitted from the node apparatus 5 through the radio interface 24. The network communication unit 31 performs transmission and reception of packets to and from the server apparatus 2 through the network interface 25. The packet analysis unit 32 performs analysis of a packet received by the radio communication unit 30 and the network communication unit 31 to extract information stored in the header part and the message part of the packet.

The setting information acquisition unit 33 acquires prescribed setting information on the provision of the gateway apparatus 6 from the server apparatus 2 when a gateway apparatus 6 is newly added. The setting information may include, for example, information elements "operating channel information", "distribution range information", and "switching time information". The operating channel information designates the channel to be used by the newly added gateway apparatus 6 after start of operation. In other words, the operating channel information designates the channel on which the new ad hoc network 4 formed by the newly added gateway apparatus 6 transmits and receives signal.

In the description that follows, the channel designated by the operating channel information may be denoted simply as "operating channel". In the example of FIG. 2A to FIG. 2C, the operating channel corresponds to channel CHx.

The distribution range information is an information element that designates the range of channels for the gateway apparatus 6 to distribute the route control packet for provisional route. In the example of FIG. 2A to FIG. 2C, the distribution range information designates channels CH1 and CH2. The distribution range information may designate one or plural channels. As illustrated in the example of FIG. 2A to FIG. 2C, the plural channels CH1 and CH2 may be channels on which different ad hoc networks 4a and 4b transmits and receives packets.

The switching time information designates the timing for the gateway apparatus 6 and the node apparatus 5 to switch the channel being used for transmission and reception of signal to the operating channel. In the description that follows, the channel designated by the switching time information may be denoted simply as "switching time".

The route control unit 34 performs route control for constructing routes between the gateway apparatus 6 and the node apparatus 5. Various protocols can be used as the route control protocol for constructing routes between the gateway apparatus 6 and the node apparatus 5. For example, the route control unit 34 may use either the proactive type protocol or reactive type protocol.

When adding a gateway apparatus 6, the route control unit 34 generates a route control packet for provisional route, and transmits the route control packet for provisional route to the node apparatuses 5. By exchanging the route control packet for provisional route with the node apparatuses 5, the route control unit 34 produces a route table 39 for designating provisional routes. The produced route table 39 is stored in the storage unit 35.

An example of the route control packet for provisional route will be described below. FIG. 5A is a view useful for illustrating the construction of a first example of the route control packet for provisional route. The route control packet for provisional route includes a header part 40 and a message part 50. The header part 40 includes a source address 41 of the packet, a destination address 42, type portion 43, TLL (Time to Live) portion 44, and a hop count portion 45. The route control packet for provisional route may be, for example, a Hello packet used in OLSR (Optimized Link State Routing), etc., or a route request packet or a route response packet.

The message part 50 includes route information 51 and gateway information 52. The route information 51 is information used to produce a route table in route control protocol. The route information 51 includes link information between the source node of the route control packet and the adjoining nodes in accordance with the route control protocol used.

An example of the gateway information 52 is depicted in FIG. 5B. The gateway information 52 includes at least a flag 53. The flag 53 is flag information for distinguishing a route control packet for route control forming an ad hoc network 4 to which the route control packet for provisional route is transmitted from the route control packet for provisional route.

The gateway information 52 may include an identifier for identifying the gateway apparatus 6. The identifier may be, for example, address information of the gateway apparatus 6. Since the gateway information 52 includes an identifier of the gateway apparatus 6, the apparatus which receives the route control packet for provisional route can distinguish the route control packets for provisional route respectively transmitted from different gateway apparatuses 6.

Referring to FIG. 4, when it is time to switch, the route control unit 34 starts exchange of route control packets for forming the route of the ad hoc network with the node apparatuses 5 using the operating channel. The route control unit 34 produces a route table for designating routes in the ad hoc network, and stores it in the storage unit 35. The construction of the route control packet exchanged after the time to switch may be, for example, the same as the construction of the route control packet for provisional route depicted in FIG. 5A.

The gateway information generating unit 36 generates gateway information 52 to be stored in the route control packet for provisional route. The decided instruction generating unit 37 generates a decided instruction packet notifying, to the node apparatus 5 receiving the route control packet for provisional route, the instruction for preserving a route table generated by each node apparatus 5.

FIG. 6A is a view useful for illustrating the construction of an example of the decided instruction packet. The header part 40 of the decided instruction packet is the same as the header part 40 of the route control packet for provisional route described with reference to FIG. 5A. The message part 50 stores provisional route decided instruction 60 and designation information 61.

The decided instruction generating unit 37 may generate a decided instruction packet, for example, by including provisional route decided instruction 60 and designation information 61 in a route control packet used in the route control protocol of the gateway apparatus 6 and the node apparatus 5. Since a decided instruction packet is generated in this manner, a decided instruction packet separate from the route control packet is not transmitted and increase of traffic of control packets can be thereby avoided.

On the other hand, a route control packet requires relatively long time to propagate node apparatuses 5. This is because each node apparatus 5 receiving the route control packet transmits a route control packet periodically in its own proper timing. Therefore, in an example, the decided instruction packet generating unit 37 generates the decided instruction packet as a flooding packet.

The node apparatus 5 receiving the flooding packet identifies the received packet as a flooding packet from the value of the type portion 43 of the header part 40, and immediately transfers the received packet. Thus, propagation time of the decided instruction packet can be reduced.

When a flooding packet is used, traffic of control packets may be increased. In an example, in order to suppress increase of control packets, the gateway apparatus 6 restricts the number of transmission of decided instruction packets to not greater than a prescribed number. In an example, for example, the number of transmission of decided instruction packets is restricted to two. In another example, MPR (Multi Point Relay) flooding is used to transmit the decided instruction packet. Also, in another example, counter-based broadcasting is used to transmit the decided instruction packet.

FIG. 6B is a view depicting an exemplary construction of designation information 61. The designation information 61 may include, for example, information elements "gateway identifier", "channel (CH) designation information", and "timing designation information". The information element "gateway identifier" indicates an identifier of the source gateway apparatus 6. The information element "channel designation information" indicates the operating channel. The information element "timing designation information" indicates the switching time.

Referring to FIG. 4, the channel switching unit 38 performs switching of the channel used by the radio interface 24 for transmission and reception of signal, that is, by the radio communication unit 30 for transmission and reception of packets.

The radio communication unit 30 transmits a route control packet for provisional route and a decided instruction packet on each of channels designated by the distribution range information. At this time, the channel switching unit 38 switches the channel used by the radio communication unit 30 successively to each of the channels designated by the distribution range information.

The channel switching unit 38 switches the transmission channel of the route control packet for provisional route, after it transmits the route control packet for provisional route on one channel, without waiting for the route control packet for provisional route to spread on the ad hoc network 4 of the channel. Thus, propagation of the route control packet for provisional route is implemented in parallel in a plurality of channels, so that the time required for the propagation of the route control packet for provisional route is reduced.

On the other hand, the decided instruction packet is transmitted after the route control packet for provisional route transmitted on each channel has spread in the ad hoc network 4. Therefore, the transmission of the decided instruction packet by the radio communication unit 30 is done when a prescribed waiting period has elapsed after the route control packet for provisional route is transmitted on the last channel. Therefore, transmission interval of the route control packets for provisional route before and after channel switching is shorter than the time period after the route control packets for provisional route is transmitted on the last channel until the decided instruction packet is transmitted. The decided instruction packet is transmitted before the switching timing. As a result, transmission interval of the route control packets for provisional route before and after channel switching is shorter than the time period after the route control packets for provisional route is transmitted on the last channel until the switching timing.

The channel switching unit 38 switches, when it is time to switch, the channel being used by the radio interface 24, i.e., the channel being used by the communication unit 30, to the operating channel.

<2-2. Node Apparatus>

Figure 7:
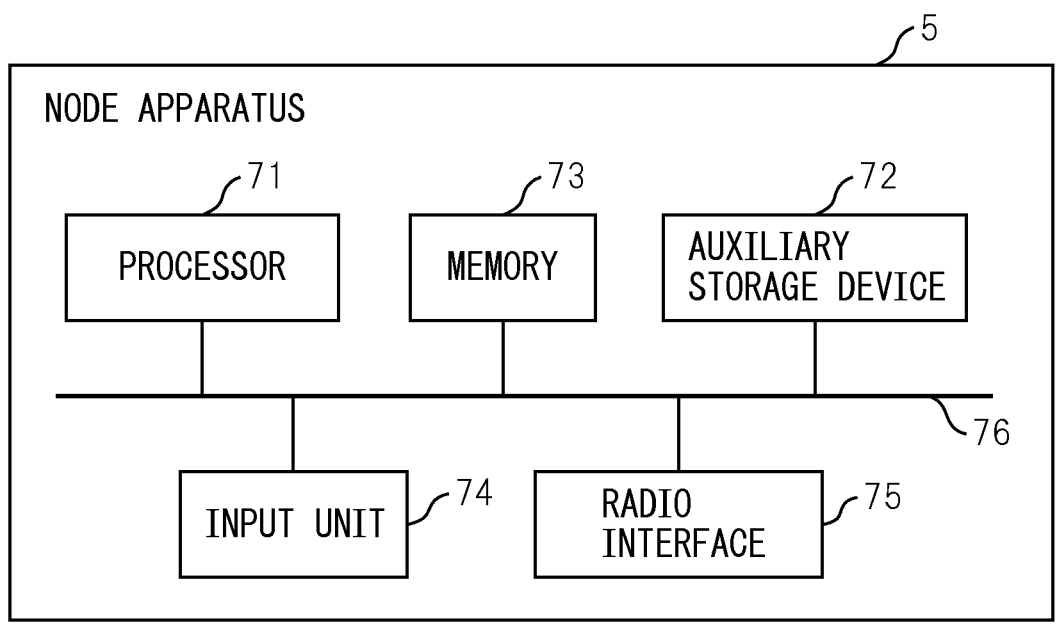
FIG. 7 is a view depicting an example of the hardware construction of a node apparatus.

Next, the construction and function of the node apparatus 5 will be described. FIG. 7 is a view depicting an example of the hardware construction of the node apparatus 5. The node apparatus 5 includes a processor 71, an auxiliary storage device 72, a memory 73, an input unit 74, a radio interface 75 and a data bus 76.

The processor 71 executes the control program stored in the auxiliary storage device 72 to thereby perform various processing for controlling the operation of the node apparatus 5, and processing for route control by the node apparatus 5 and for channel switching. In the auxiliary storage device 72 as described below, the control program for causing the processor 71 to execute aforementioned processing is stored. The auxiliary storage device 72 may include a non-volatile memory, a Read-Only-Memory (ROM), or a hard disc as storage elements.

The memory 73 stores a program being executed by the processor 71, and data temporarily used by this program. The memory 73 may include a random access memory (RAM). The input unit 74 is a constituent for receiving input of information acquired by the node apparatus 5. For example, when the communication system is a data collection system as described above, the input unit 74 has the function of acquiring meter-reading data from power, gas, and water consumption meters. The input unit 74 may include a user interface for receiving input operation by an operator.

The radio interface 75 performs radio communication processing with other node apparatuses 5 and the gateway apparatus 6. The radio interface 75 can select one of plurality of channels provided in advance and can use it to transmit and receive signal. The channel used by the radio interface 75 to transmit and receive signal is selected by the processor 71 executing the processing described below. The above-described constituents 71~75 are electrically connected by the data bus 76.

Figure 8:
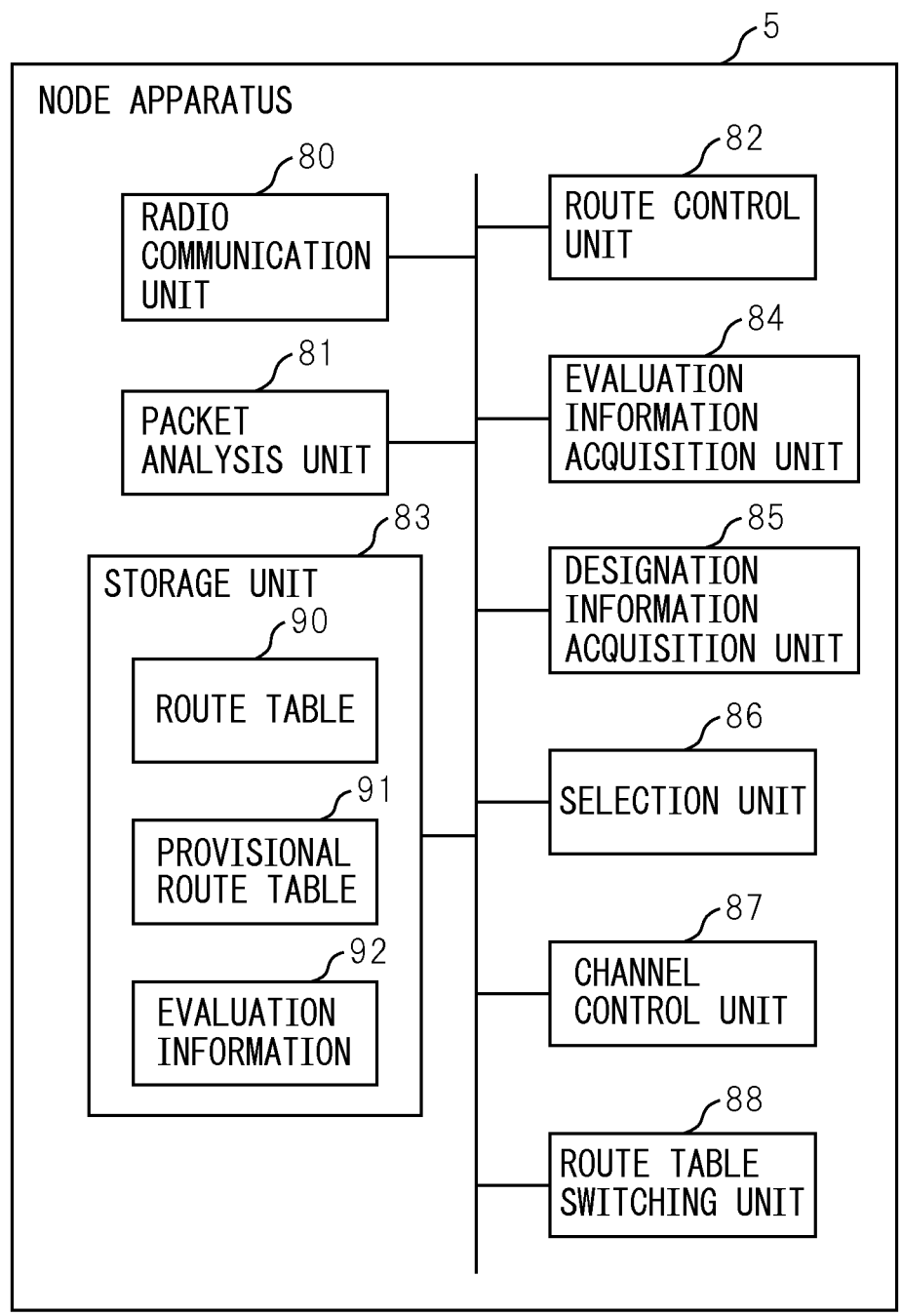
FIG. 8 is a view depicting an example of the construction of a node apparatus.

FIG. 8 is a view depicting an example of the construction of the node apparatus 5. The processor 71 of FIG. 7 performs information processing by the constituents of the node apparatus 5 as depicted in FIG. 8 in accordance with the program stored in the auxiliary storage device 72 and in cooperation with other hardware elements of the node apparatus 5 as required. FIG. 8 illustrates mainly the functions related to following description. Therefore, the node apparatus 5 may include constituents other than those depicted in FIG. 8.

The node apparatus 5 includes a radio communication unit 80, a packet analysis unit 81, a route control unit 82, a storage unit 83, an evaluation information acquisition unit 84, a designation information acquisition unit 85, a selection unit 86, a channel control unit 87, and a route table switching unit 88. In the description that follows, when it is necessary to distinguish between the gateway apparatus 6 to which the node apparatus 5 belongs at present and the newly added gateway apparatus 6, the former is denoted as the gateway apparatus 6a and the latter is denoted as the gateway apparatus 6c.

The radio communication unit 80 transmits and receives packets to and from the other node apparatus 5 in the ad hoc network 4 to which the node apparatus 5 belongs or the gateway apparatus 6 connected to this ad hoc network 4. The packet analysis unit 81 performs analysis of the packet received by the radio communication unit 80, and extracts information stored in the header part and message part of the packet.

The route control unit 82 performs route control for constructing a route for the node apparatus 5 to transfer a packet. The route control unit 82 performs transmission and reception of route control packets exchanged in the ad hoc network 4 to which the node apparatus 5 presently belongs. The route control unit 82 prepares a route table 90 used for transferring packets in the ad hoc network 4 based on the received route control packets. The route control unit 82 stores the route table 90 in the storage unit 83.

When the node apparatus 5 receives a route control packet for provisional route, the route control unit 82 prepares a provisional route table 91 for designating provisional routes based on the route information stored in this packet. The route control unit 82 transmits the route control packet for provisional route in broadcast format via the radio communication unit 80. The route control unit 82 stores the provisional route table 91 in storage unit 83.

The channel on which the radio communication unit 80 transmits and receives packets, i.e., the channel on which the radio interface 75 transmits and receives signal, is set to the channel on which the ad hoc network 4 to which the node apparatus 5 belongs transmits and receives packets. Thus, transmission and reception of the route control packet for provisional route are done on the channel on which the ad hoc network 4 including the node apparatus 5 transmits and receives packets.

The evaluation information acquisition unit 84 acquires the evaluation information on the gateway apparatus 6a connected to the ad hoc network 4 to which the node apparatus 5 presently belongs. The evaluation information may be, for example, hop count from the node apparatus 5 to the gateway apparatus 6. The evaluation information acquisition unit 84 may acquire the hop count to the gateway apparatus 6a from the header of a flooding packet received from the gateway apparatus 6a.

Figure 9:
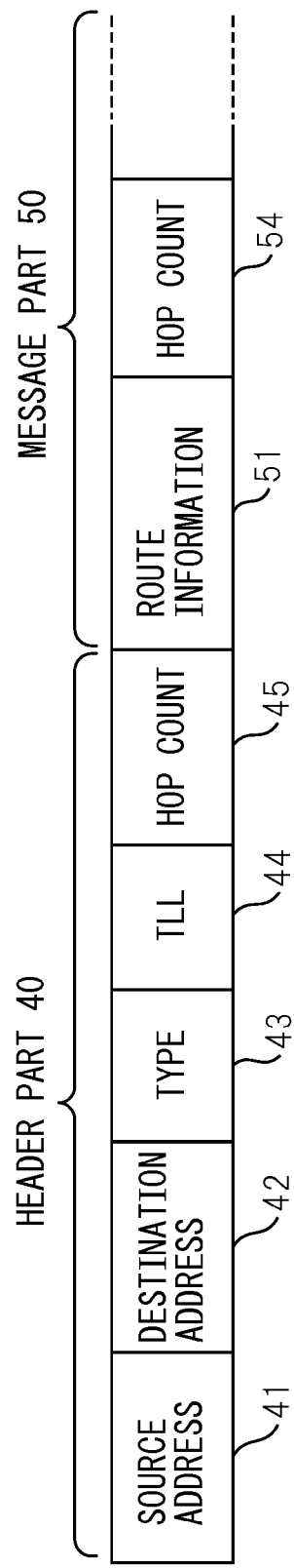
FIG. 9 is a view useful for illustrating the construction of an example of a route control packet.

In an example, by referring to the route control packet, the evaluation information acquisition unit 84 may acquire hop count to the gateway apparatus 6. FIG. 9 is a view useful for illustrating the construction of an example of a route control packet. In this example, the node apparatus 5 stores the hop count between the node apparatus 5 and the gateway apparatus 6 in the storage unit 83. When transmitting the route control packet, the node apparatus 5 stores the hop count to the gateway apparatus 6 in the hop count portion 54 of the message part 50. When receiving a route control packet, the evaluation information acquisition unit 84 determines the hop count from the node apparatus 5 to the gateway apparatus 6 by adding "1" to the hop count from the adjoining node to the gateway apparatus 6 stored in the hop count portion 54 of the message part 50.

In other example, by transmission from the gateway apparatus 6a of information such as processing capability, number of accommodated lines, etc., to the node apparatus 5, the evaluation information acquisition unit 84 may acquire these information as evaluation information 92. The evaluation information acquisition unit 84 stores the acquired evaluation information 92 in the storage unit 83.

Referring to FIG. 8, the designation information acquisition unit 85 acquires the designation information 61 stored in the message part 50 of a decided instruction packet, when the node apparatus 5 receives a decided instruction packet. Reception of the decided instruction packet is done on the channel on which the ad hoc network 4 including the node apparatus 5 transmits and receives packet. The route control unit 82 preserves the provisional route table 91 prepared until then in accordance with the provisional route decided instruction of the decided instruction packet.

When the node apparatus 5 receives a decided instruction packet, the selection unit 86 selects either one of more favorable condition between the gateway apparatus 6c transmitting the route control packet for provisional route and the gateway apparatus 6a connected to the ad hoc network 4 to which the node apparatus 5 belongs. For example, based on the respective hop count from these gateway apparatuses 6 to the node apparatus 5, nearer one may be selected.

When the decided instruction packet is transmitted as a flooding packet, the selection unit 86 may acquire the hop count to the gateway apparatus 6c from the header part. Also, hop count to the gateway apparatus 6c may be acquired by providing the hop count portion 54 in the message part 50 of the route control packet for provisional route as in the rote control packet of FIG. 9 as described above.

In an example, the selection unit 86 may compare the processing capability and the number of accommodated lines between the gateway apparatuses 6a and 6c, and select either gateway apparatus 6 of more favorable condition. In order to compare with the evaluation information 92 of the processing capability and the number of accommodated lines of the gateway apparatus 6c, the decided instruction packet generating unit 37 of the gateway apparatus 6 may store information such as the processing capability and the number of accommodated lines of the gateway apparatus 6 in the message part 50 of the decided instruction packet.

The channel control unit 87 performs the control of the channel used by the radio interface 75 to transmit and receive signal, i.e., used by the radio communication unit 80 to transmit and receive packets. When the selection unit 86 has selected the gateway apparatus 6c and when it is time to switch designated in the designation information 61, the channel control unit 87 switches the channel used by the radio interface 75 to transmit and receive signal to the operating channel designated in the designation information 61. When the selection unit 86 has selected the gateway apparatus 6a, the channel control unit 87 does not switch the channel used by the radio interface 75 to transmit and receive signal.

When the selection unit 86 has selected the gateway apparatus 6c and the switching time designated in the designation information has come, the route table switching unit 88 switches the route table used by the route control unit 82 to transfer the packets, from the route table stored in the storage unit 83 to the provisional route table 91. When the selection unit 86 has selected the gateway apparatus 6a, the route table switching unit 88 discards the provisional route table 91.

<2-3. Illustration of Channel Switching Processing>

Figure 10:
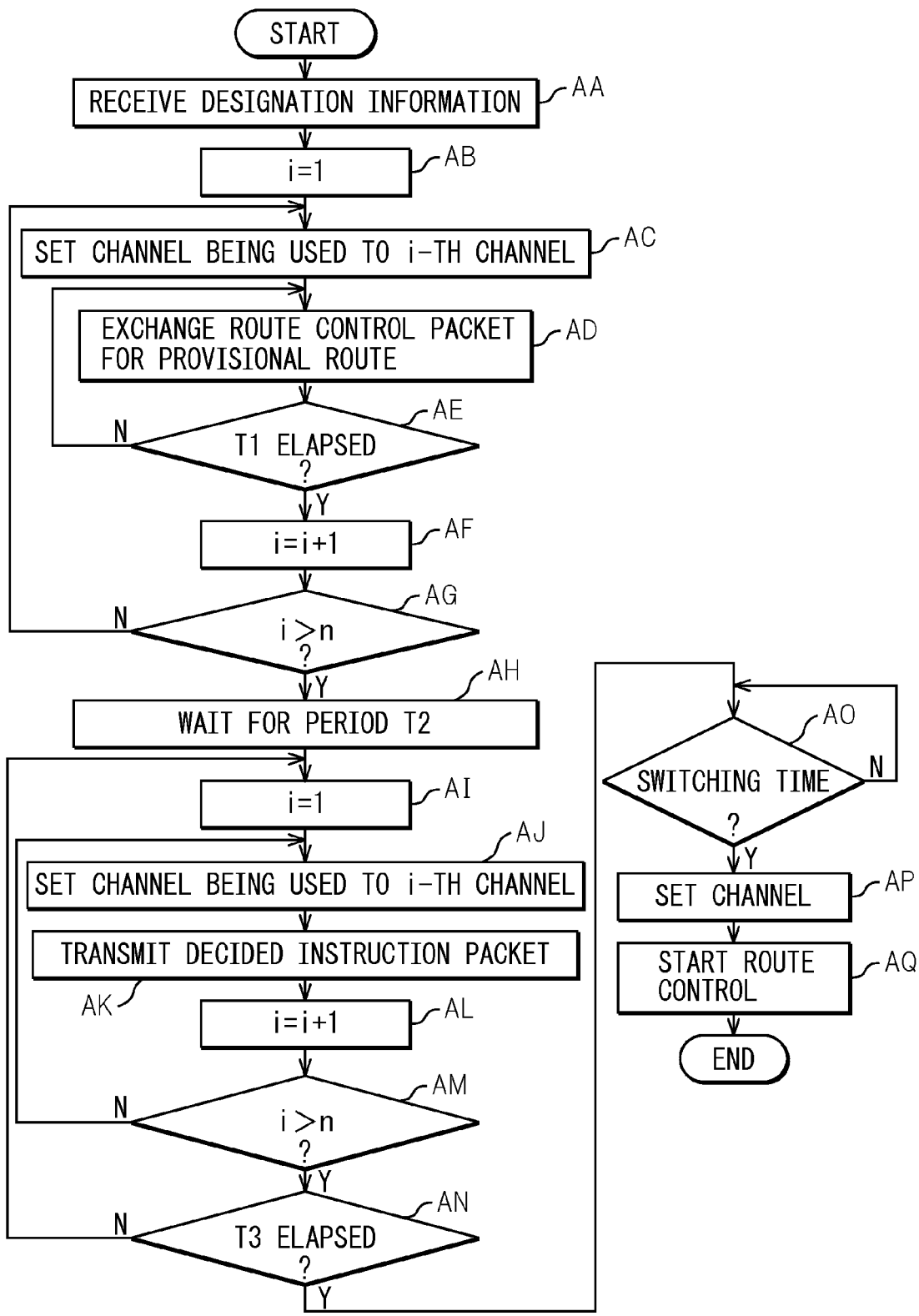
FIG. 10 is a view useful for illustrating a first example of processing of a gateway apparatus.

The channel switching processing of the node apparatus 5 of the present embodiment will be described. FIG. 10 is a view useful for illustrating a first example of the processing of the gateway apparatus 6 when a gateway apparatus 6 is newly added. In other embodiments, following operations AA~AQ may be steps.

In operation AA, the setting information acquisition unit 33 acquires prescribed setting information on setting of the gateway apparatus 6 from the server apparatus 2. In operation AB, value of the variable i referring to the channel designated in the distribution range information is initialized to "1". In the description that follows, it is supposed that the number of channels designated in the distribution range information is n.

In operation AC, the channel switching unit 38 switches the channel used by the radio communication unit 30 for receiving packets to the i-th channel Chi. In operation AD, the route control unit 34 generates a route control packet for provisional route. The route control unit 34 exchanges the route control packet for provisional route with the node apparatus 5 of the ad hoc network 4 transmitting and receiving packets on the channel Chi. If the route table for provisional route has been prepared in the channel before switching, the route control unit 34 discards the route table at the time of switching to the channel CHi.

In operation AE, the route control unit 34 determines whether or not a prescribed transmission period T1 has elapsed. If the transmission period T1 has elapsed (operation AE: Y), the processing proceeds to operation AF. If the transmission period T1 has not elapsed (operation AE: N), the processing returns to operation AD.

In operation AF, the value of the variable i is increased by one. In operation AG, it is determined whether or not the value of the variable i exceeds the number n of channels designated in the distribution range information. If the value of the variable i does not exceed the number n (operation AG: N), the processing returns to operation AC.

Thereafter, immediately in operation AC, the channel switching unit 38 switches the channel. In operation AD, the route control packet for provisional route is exchanged on the switched channel.

On the other hand, if the value of the variable i exceeds the number n (operation AG: Y), the processing of the route control packet for provisional route is finished, and the processing proceeds to operation AH. In operation AH, the gateway apparatus 6 waits for a prescribed period T2 for the next operation AI to start, to thereby wait for the route control packet for provisional route to be spread in the ad hoc network 4.

In operation AI, the value of the variable i referring to the channel is initialized to "1". In operation AJ, the channel switching unit 38 switches the channel used by the radio communication unit 30 for receiving packets to the i-th channel Chi. In operation AK, the radio communication unit 30 transmits a decided instruction packet on the channel Chi.

In operation AL, the value of the variable i is increased by one. In operation AM, it is determined whether or not the value of the variable i exceeds the number n of channels designated in the distribution range information. If the value of the variable i does not exceed the number n (operation AM: N), the processing returns to operation AJ. If the value of the variable i exceeds the number n (operation AM: Y), in operation AN, it is determined whether or not the period of transmission processing of the decided instruction packet in operations AI~AM exceeds a prescribed period T3.

If the period of transmission processing of the decided instruction packet exceeds the prescribed period T3 (operation AN: Y), the processing proceeds to operation AO. If the period of transmission processing of the decided instruction packet does not exceed the prescribed period T3 (operation AN: N), the processing returns to AI.

In operation AO, the route control unit 34 and the channel switching unit 38 determines whether or not it is time to switch. When it is not time to switch (operation AO: N), the processing returns to operation AO. When it is time to switch (operation AO: Y), the processing proceeds to operation AP.

In operation AP, the channel switching unit 38 switches the channel used by the radio interface 24 to the operating channel designated in the setting information. In operation AQ, the route control unit 34 exchanges route control packet with the node apparatus 5 on the switched channel to thereby start route control in the newly formed ad hoc network.

Figure 11:
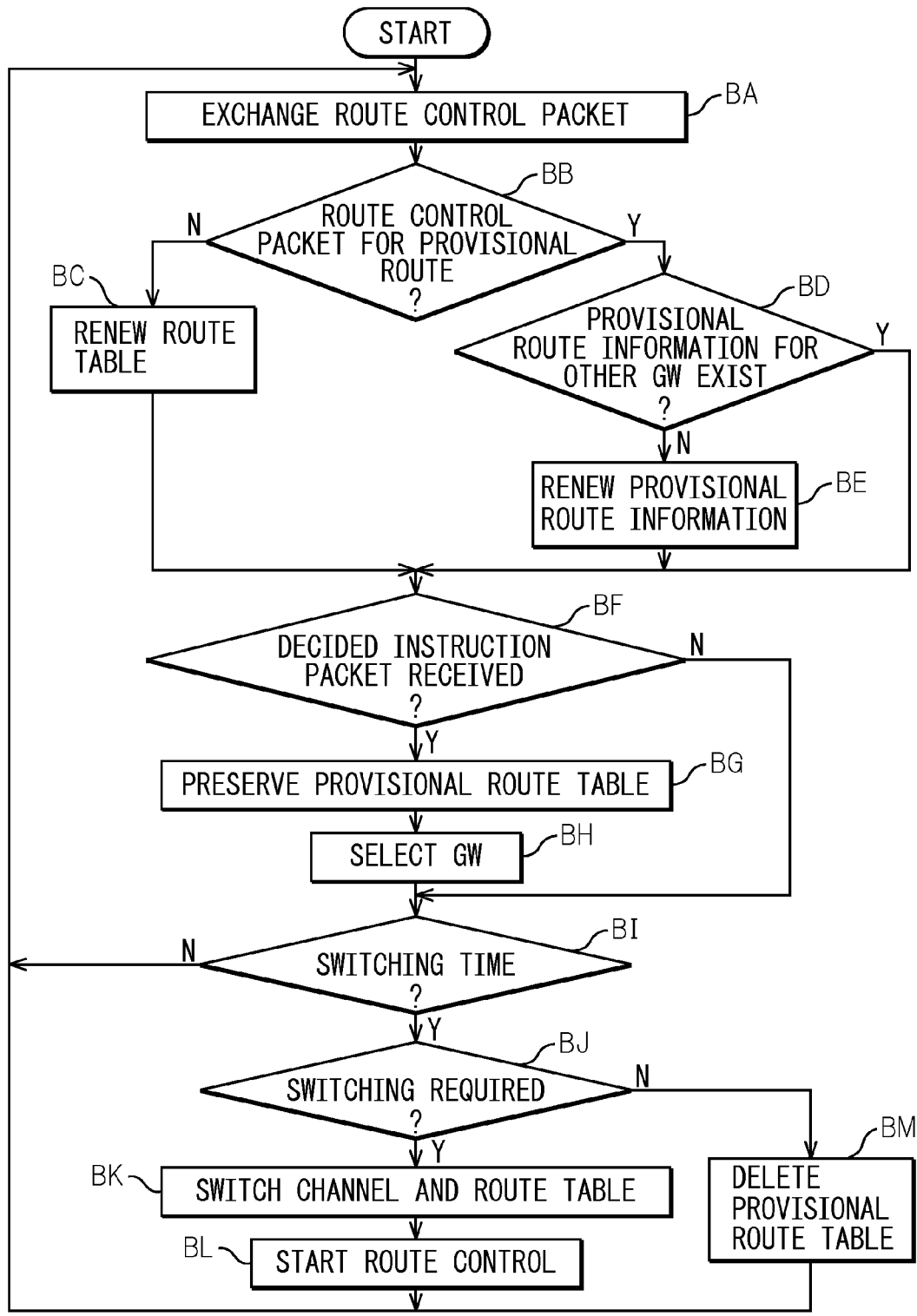
FIG. 11 is a view useful for illustrating a first example of processing of a node apparatus.

Next, the processing on the side of the node apparatus 5 will be described. FIG. 11 is a view useful for illustrating a first example of the processing in the node apparatus 5. In other embodiments, following operations BA~BM may be steps.

In operation BA, the route control unit 82 performs transmission and reception of route control packets in the ad hoc network 4 to which the node apparatus 5 presently belongs. In operation BB, the route control unit 82 determines whether or not the received route control packet is the route control packet for provisional route. If the received route control packet is not the route control packet for provisional route (operation BB: N), the processing proceeds to operation BC. If the received route control packet is the route control packet for provisional route (operation BB: Y), the processing proceeds to operation BD.

In operation BC, the route control unit 82 renews the route table 90 used for transferring packets in the ad hoc network 4 based on the received route control packet. Thereafter, the processing proceeds to operation BF.

In operation BD, the route control unit 82 determines whether or not a provisional route table 91 prepared for a gateway apparatus other than the source gateway apparatus of the received route control packet for provisional route has been stored in the storage unit 83.

If the provisional route table 91 has been stored in the storage unit 83 (operation BD: Y), the route control unit 82 discards the received route control packet for provisional route. Otherwise (operation BD: N), the processing proceeds to operation BE. In operation BE, the route control unit 82 renews the provisional route table 91 for designating a provisional route based on the received route control packet for provisional route. Thereafter, the processing proceeds to operation BF.

In operation BF, the route control unit 82, the designation information acquisition unit 85 and the selection unit 86 determine whether or not the node apparatus 5 has received a decided instruction packet. If the node apparatus 5 has received a decided instruction packet (operation BF: Y), the processing proceeds to operation BG. If the node apparatus 5 has not received a decided instruction packet (operation BF: N), the processing proceeds to operation BH.

In operation BG, the route control unit 82 preserves the provisional route table 91 in accordance with the provisional route decided instruction of the decided instruction packet. The designation information acquisition unit 85 acquires designation information 61. Thereafter, the processing proceeds to operation BH.

In operation BH, the route control unit 82 and the channel control unit 87 determine whether or not when it is time to switch. When it is not time to switch (operation BH: N), the processing returns to operation BA. When it is time to switch (operation BH: Y), the processing proceeds to operation BI.

In operation BI, the selection unit 86 selects either one of favorable condition between the gateway apparatus 6c transmitting the route control packet for provisional route and the gateway apparatus 6a connected to the ad hoc network 4 to which the node apparatus 5 presently belongs.

In operation BJ, the route control unit 82 and the channel control unit 87 determine whether or not channel switching is necessary, i.e., whether or not the selection unit 86 has selected the gateway apparatus 6c. If channel switching is necessary (operation BJ: Y), the processing proceeds to operation BK. If channel switching is not necessary (operation BJ: N), the processing proceeds to operation BM.

In operation BK, the channel control unit 87 switches the channel used by the radio interface 75 for transmission and reception of signal to the operating channel designated by the designation information 61. The route table switching unit 88 switches the route table used by the route control unit 82 for transferring packets from the route table 90 stored in the storage unit 83 to the provisional route table 91.

In operation BL, the route control unit 82 exchange route control packets on the switched channel to thereby start route control in the newly formed ad hoc network. Thereafter, the processing returns to operation BA.

In operation BM, the route table switching unit 88 discards the provisional route table 91. Thereafter, the processing returns to operation BA.

<2-4. Transmission Timing of Route Control Packet for Provisional Route and Decided Instruction Packet>

Next, referring to FIG. 12 and FIG. 13, transmission timing of route control packet for provisional route and decided instruction packet will be described. In the description that follows, following conditions are presumed.

(1) The operating channel of the newly added gateway apparatus 6c is CHx.

(2) The distribution range information designates CH1 and CH2 as the range of channels on which the gateway apparatus 6c transmits the route control packet for provisional route.

(3) On the channel CH1, the node apparatuses 5a~5e form an ad hoc network 4a, and the ad hoc network 4a is connected to the gateway apparatus 6a.

(4) On the channel CH2, the node apparatuses 5f~5i form an ad hoc network 4b, and the ad hoc network 4b is connected to the gateway apparatus 6b.

Figure 12:
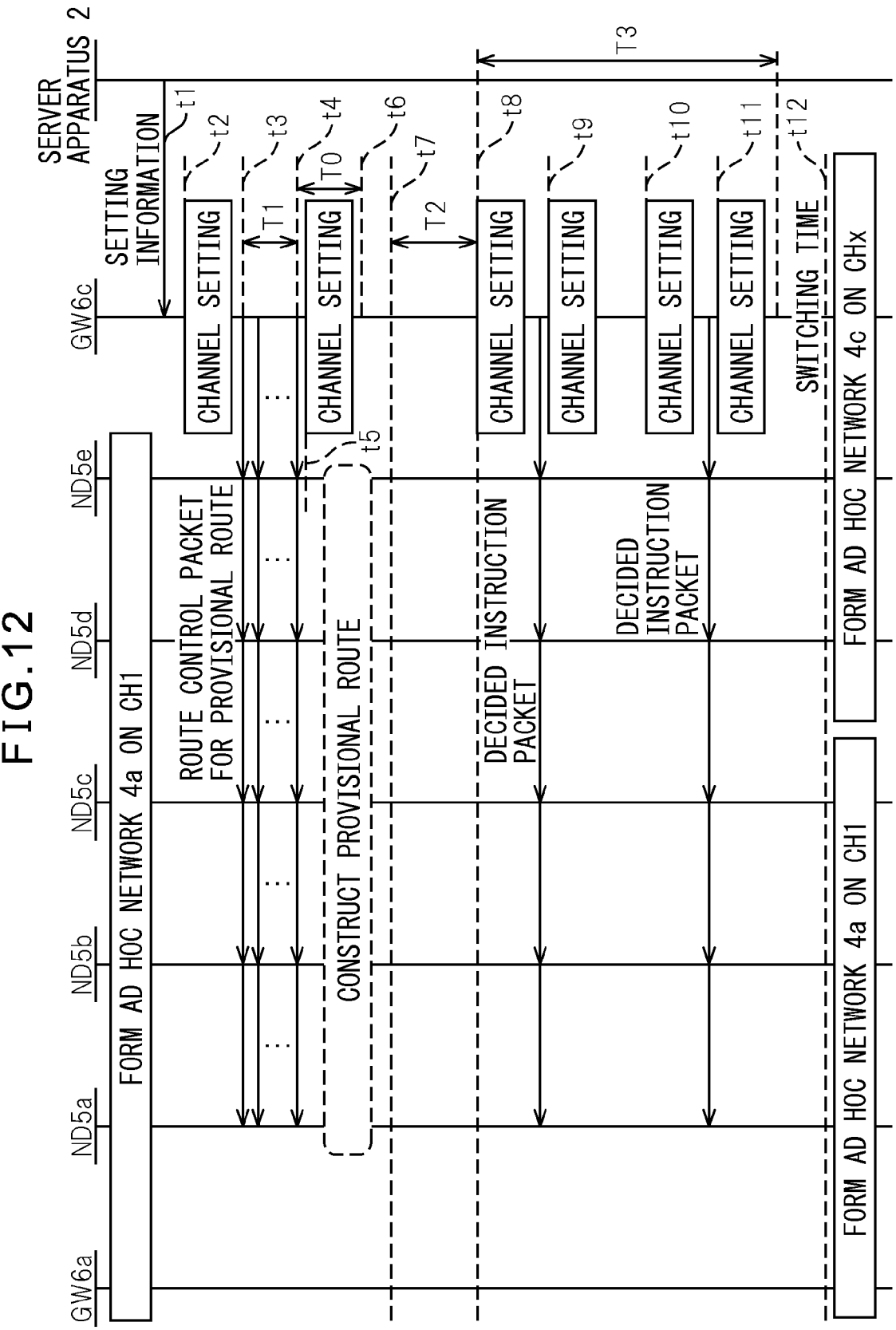
FIG. 12 is a view (1) useful for illustrating transmission timing of a route control packet for provisional route and a decided instruction packet.
Figure 13:
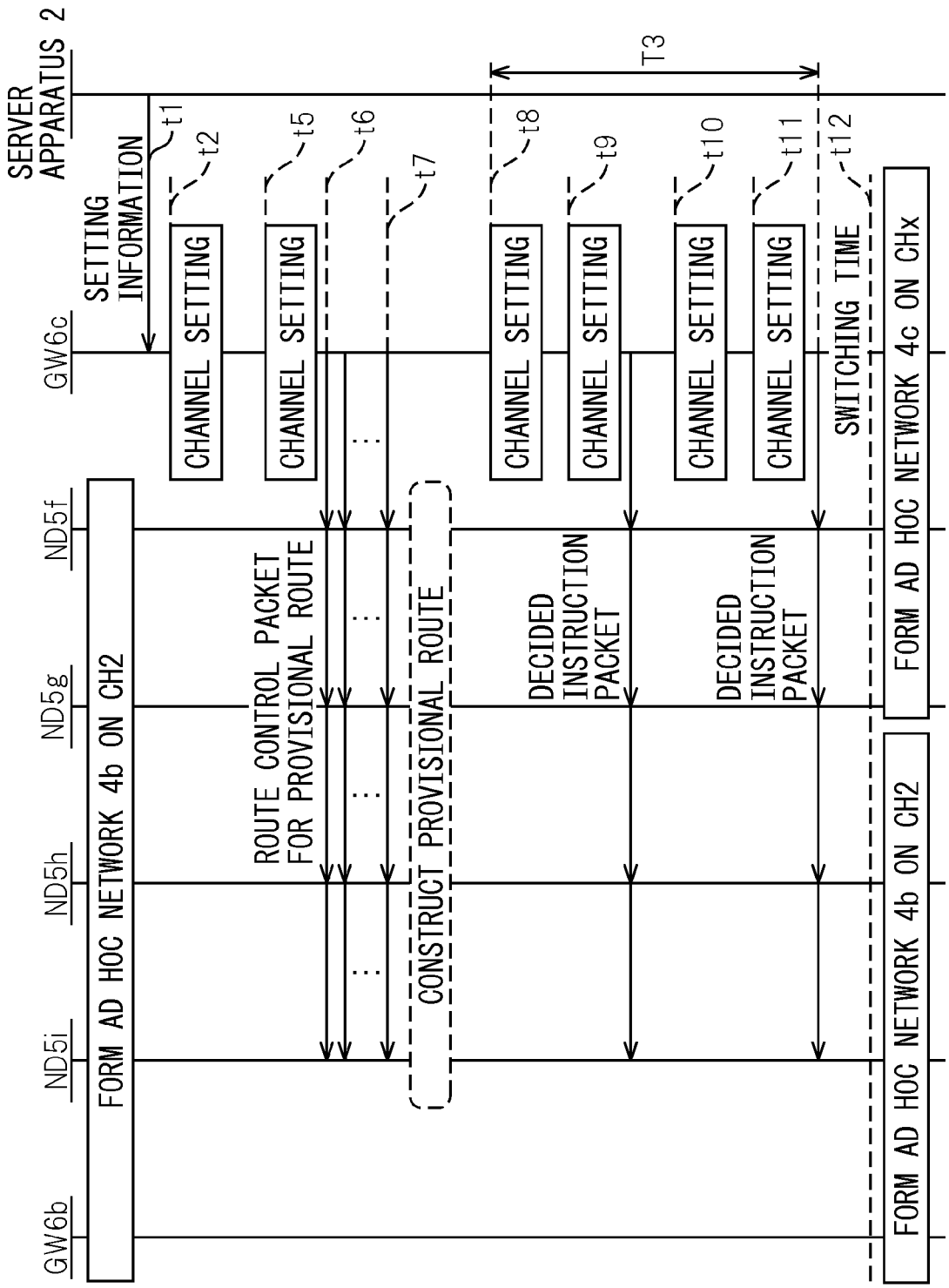
FIG. 13 is a view (2) useful for illustrating transmission timing of a route control packet for provisional route and a decided instruction packet.

FIG. 12 is a view depicting transmission sequence of a route control packet for provisional route and a decided instruction packet on the channel CH1, and FIG. 13 is a view depicting transmission sequence of a route control packet for provisional route and a decided instruction packet on the channel CH2. Time t1~t12 indicated in FIG. 12 and time t1~t12 indicated in FIG. 13 indicate respectively same time.

At time t1, the gateway apparatus 6c acquires setting information from the server apparatus 2. At a later time t2, the gateway apparatus 6c sets the channel for transmission and reception of packets to the channel CH1. Thereafter, in the period t3~t4, the gateway apparatus 6c transmits the route control packet for provisional route repeatedly on the channel CH1 for the period T1, and exchanges the route control packet for provisional route with the node apparatuses 5a~5e.

At time t5 after time t4, the gateway apparatus 6c sets the channel for transmission and reception of packets to the channel CH2. In the period t6~t7, the gateway apparatus 6c transmits the route control packet for provisional route repeatedly on the channel CH2 for the period T1, and exchange the route control packet for provisional route with the node apparatuses 5f~5i. In the period T0 between time t4~t6, channel switching is performed by the gateway apparatus 6c. The period T0 is relatively short as compared to the periods T1, T2 and T3.

In an example in which the distribution range information designates three or more channels, the gateway apparatus 6c may transmit the route control packet for provisional route on the third channel, and so on.

At time t7, after transmission of the route control packet for provisional route is finished, the gateway apparatus 6c waits for a waiting period T2. During this period, the route control packet for provisional route is spread in the ad hoc networks 4a and 4b, and as a result, provisional routes are constructed between the gateway apparatus 6c and the node apparatuses 5a~5e, and between the gateway apparatus 6c and the node apparatuses 5f~5i.

Therefore, the period of the transmission interval T0 of the route control packet for provisional route on the channels CH1 and CH2 is shorter than the period from the transmission ending time t7 of the route control packet for provisional route on the last channel CH2 to the transmission time of the decided instruction packet. Also, since switching time t12 comes after the transmission time of the decided instruction packet, transmission interval T0 is shorter than the period from the transmission ending time t7 of the route control packet for provisional route on the last channel CH2 to the switching time t12.

After the waiting period T2 has elapsed, at time t8, the gateway apparatus 6c sets the channel for transmission and reception of packets to the channel CH1, and transmits a decided instruction packet. Then, at time t9, the gateway apparatus 6c sets the channel for transmission and reception of packets to the channel CH2, and transmits a decided instruction packet. In an example in which the distribution range information designates three or more channels, the decided instruction packet may be transmitted on the third channel, and so on.

Then, at time t10, the gateway apparatus 6c sets the channel for transmission and reception of packets to the channel CH1, and transmits a decided instruction packet. At time t11, the gateway apparatus 6c sets the channel for transmission and reception of packets to the channel CH2, and transmits a decided instruction packet. Transmission of the decided instruction packet is repeated for a period T3.

Then, at time t12, switching time has come. The node apparatuses 5d~5g changes the channel used by the radio interface 75 to the channel CHx, so that a new ad hoc network 4c connected to the gateway apparatus 6c is formed. On the other hand, each of the node apparatuses 5a~5c belongs as it is to the ad hoc network 4a. Each of the node apparatuses 5h and 5i belongs as it is to the ad hoc network 4b.

In accordance with the present embodiment, the node apparatus 5 forming the existing ad hoc network 4 exchanges the route control packet for provisional route for constructing a provisional route to the newly added gateway apparatus on the channel used in the existing ad hoc network 4. Thus, while maintaining the connection to the existing ad hoc network 4, the node apparatus 5 exchanges the route control packet for provisional route with the newly added gateway apparatus, and therefore the range of the node apparatuses that belong to the new network can be determined.

Therefore, it is an object of the present embodiment to avoid shut-down of communication at the time of adding a gateway apparatus 6. In accordance with the present embodiment, the route control packet for provisional route is exchanged on the same channel as has been used in existing ad hoc network 4, so that the node apparatus needs not be provided with a plurality of radio interfaces.

Also, in the present embodiment, when there is a plurality of existing networks, the gateway apparatus 6 transmits the route control packet for provisional route on respective channels used by these ad hoc networks 4. When the gateway apparatus 6 transmits the route control packet for provisional route on each channel, the channel on which the route control packet for provisional route is transmitted is switched successively to the channel used in respective ad hoc network 4.

At this time, the gateway apparatus 6 switches the transmission channel of the route control packet for provisional route without waiting for the route control packet for provisional route to be spread in the ad hoc network, and transmits the route control packet for provisional route to the next network. Therefore, in accordance with the present embodiment, when there are a plurality of ad hoc networks to which the route control packet for provisional route needs to be transmitted, processing time of transmission of the route control packet for provisional route can be shortened.

3. Second Embodiment

Next, another embodiment will be described. In a second embodiment, transmission of the decided instruction packet is omitted. The gateway apparatus 6 stored the switching time information and the operating channel information in the route control packet for provisional route in order to transmit these information to the node apparatuses 5. By omitting transmission of the decided instruction packet, increase of the traffic of control packets can be suppressed.

The node apparatus 5 implements, when the switching time acquired from the switching time information stored in the route control packet for provisional route has come, the selection of the gateway apparatus of favorable condition and the channel switching.

Figure 14:
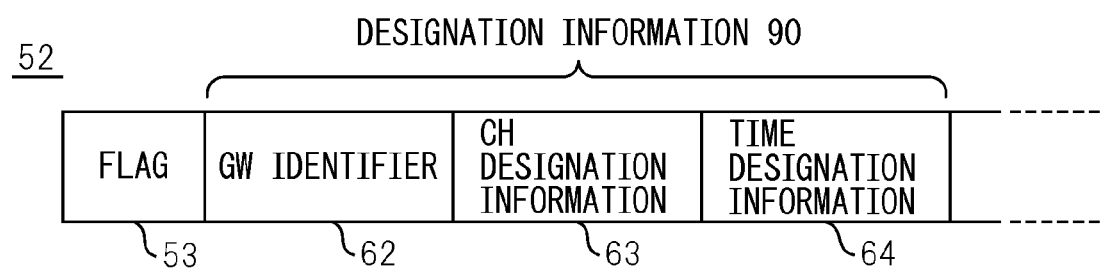
FIG. 14 is a view useful for illustrating an example of the construction of gateway information in a second embodiment.

FIG. 14 is a view useful for illustrating an example of the construction of gateway information 52 stored in the route control packet for provisional route in the second embodiment. The gateway information 52 includes a flag 53 and designation information 90. The designation information 90 may be same as the designation information of the decided instruction packet described with reference to FIG. 6B.

Figure 15:
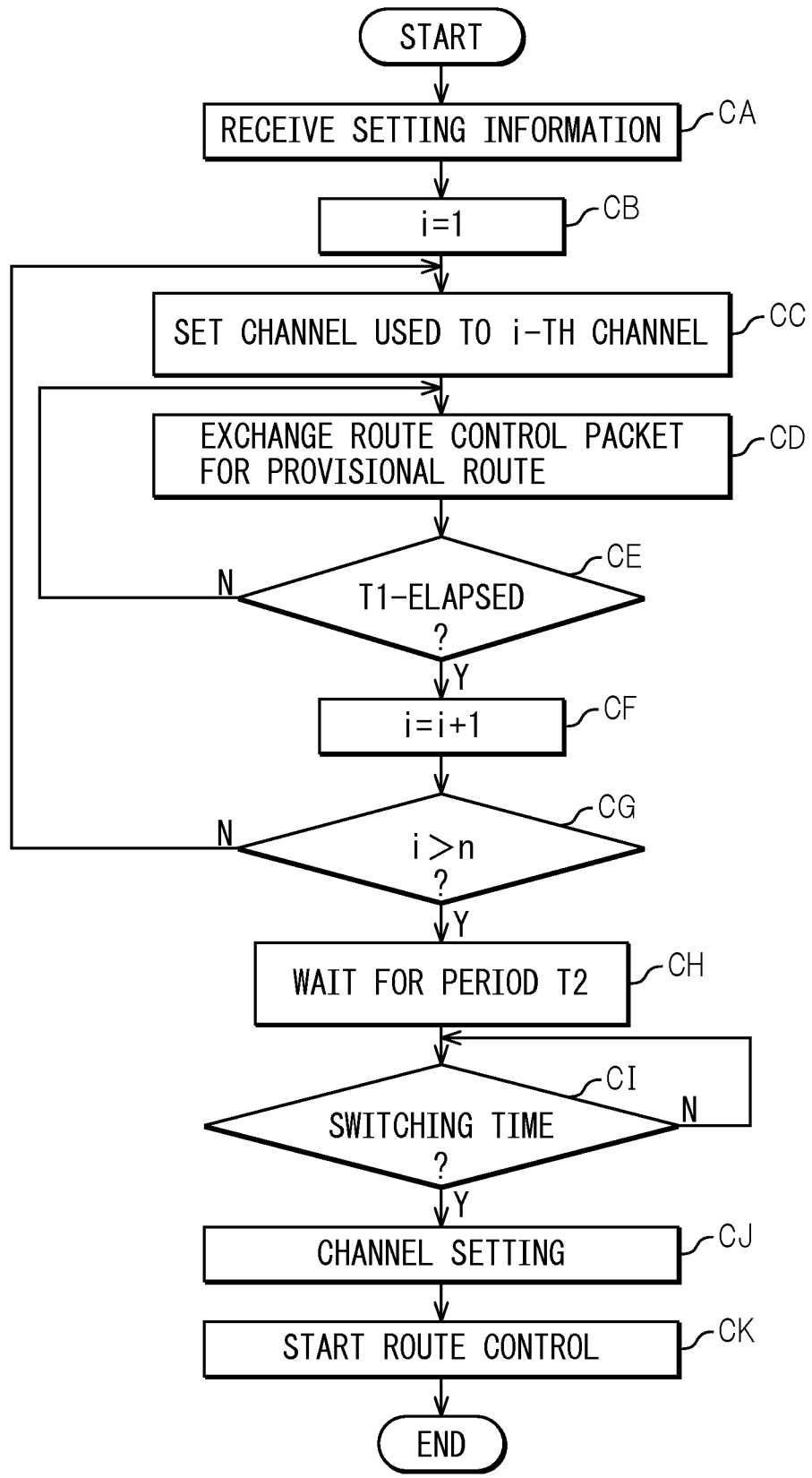
FIG. 15 is a view useful for illustrating a second example of processing of a gateway apparatus.

Next, channel switching processing of the node apparatus 5 of the present embodiment will be described. FIG. 15 is a view useful for illustrating a second example of the processing in the gateway apparatus 6. In other embodiments, following operations CA~CK may be steps.

The processing in the operations CA~CC is the same as the processing in operations AA~AC of FIG. 10. In operation CD, the gateway information generating unit 36 acquires "operating channel information" and "switching time information" from the setting information acquired from the server apparatus 2. The gateway information generating unit 36 generates gateway information 52 including the setting information 90. The route control unit 34 exchanges the route control packet for provisional route with the node apparatuses 5 of the ad hoc network 4 transmitting and receiving packets on the channel CHi.

The processing in operations CE~CH is the same as the processing in operations AE~AH of FIG. 10. Also, the processing in operations CI~CK is the same as the processing in operations AO~AQ of FIG. 10.

Figure 16:
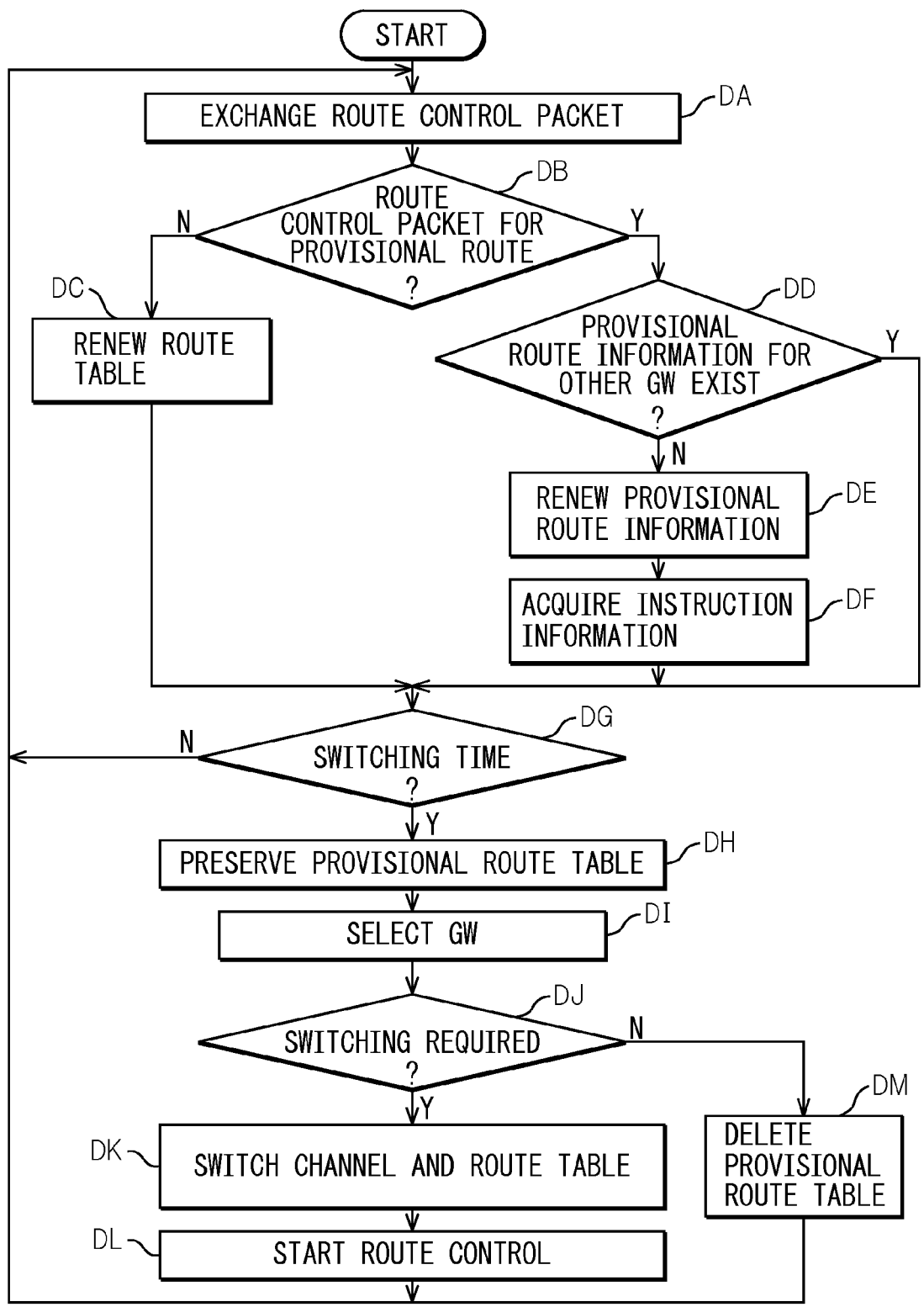
FIG. 16 is a view useful for illustrating a second example of processing of a node apparatus.

FIG. 16 is a view useful for illustrating a second example of the processing in the gateway apparatus 6. In other embodiments, the following operations DA~DM may be steps. The processing in operations DA~DE is the same as the processing in operations BA~BE of FIG. 11.

After operation DE, in operation DF, the designation information acquisition unit 85 acquires designation information 61. In other embodiments, operation DE may be implemented after operation DF. Thereafter, the processing proceeds to operation DG.

In operation DG, the route control unit 82, the selection unit 86 and the channel control unit 87 determine whether or not when it is time to switch. When it is not time to switch (operation DG: N), the processing returns to operation DA. When it is time to switch (operation DG: Y), the processing proceeds to operation DH.

In operation DH, the route control unit 82 preserves the provisional route table 91. In operation DI, the selection unit 86 selects either one of favorable condition between the gateway apparatus 6c transmitting the route control packet for provisional route and the gateway apparatus 6a connected to the ad hoc network 4 to which the node apparatus 5 belongs at present. In other embodiments, operation DH may be implemented after operation DI. The processing in operations DJ~DM is the same as the processing in operations BJ~BM of FIG. 11.

In accordance with the present embodiment, transmission of a decided instruction packet may be omitted. Increase of the traffic of the control packet can be thereby suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A gateway apparatus connecting an ad hoc network to other network, the gateway apparatus comprising:
   a route control packet generating unit that generates a route control packet for route control for constructing routes between node apparatuses forming said ad hoc network and said gateway apparatus;
   a channel designation signal generating unit that generates channel designation signal for designating a second channel different from a first channel on which said ad hoc network transmits and receives packets;
   a time designation signal generating unit that generates time designation signal for designating switching time to the node apparatus for switching the channel used for transmission and reception of packets to said second channel;
   a radio communication unit that transmits said route control packet, said channel designation signal and said time designation signal on said first channel; and
   a channel switching unit that switches, when it is time to switch, the channel on which said radio communication unit transmits and receives signal to said second channel.

2. The gateway apparatus according to claim 1, wherein said channel switching unit switches the channel on which said radio communication unit transmits said route control packet, said channel designation signal and said time designation signal successively to each of respective channels on which a plurality of ad hoc networks transmit packets, and
   wherein the interval between transmission of said route control packet on one channel and transmission of said route control packet on the next channel is set so as to be shorter than the period from the completion of transmission of said route control packet on the last channel to said switching time.

3. A node apparatus comprising:
   a radio communication unit capable of switching the channel used for transmission and reception of packets;
   a route control unit that receives and transmits through said radio communication unit a route control packet for route control for constructing routes between a second gateway apparatus different from a first gateway apparatus connected to said ad hoc network and node apparatuses forming said ad hoc network, transmitted through the ad hoc network to which said node apparatus belongs;
   a designation information acquisition unit that acquires, from a channel designation signal and a time designation signal transmitted through said ad hoc network and received by said radio communication unit, the designation of a second channel different from a first channel on which said ad hoc network transmits and receives packets and the channel switching time;
   a selection unit that select either one of said first gateway apparatus and a second gate way apparatus; and
   a channel control unit that switches, when said selection unit selects said second gateway apparatus and when it is time to switch, the channel used by said radio communication unit for transmission and reception of signal to said second channel.

4. The node apparatus according to claim 3, further comprising:
   a route table storage unit that stores a route table prepared through the route control by said route control unit based on said route control packet; and
   said route table switching unit that switches, when said selection unit selects said second gateway apparatus and when said channel switching time has come, the route table used by said node apparatus for transferring packets to the route table stored in said route table storage unit.

5. A communication system comprising node apparatuses forming an ad hoc network, a first gateway apparatus connecting the ad hoc network to other network, and a second gateway apparatus, wherein said second gateway apparatus comprises:

a route control packet generating unit that generates a route control packet for route control for constructing routes between node apparatuses forming said ad hoc network and said second gateway apparatus;

a channel designation signal generating unit that generates channel designation signal for designating a second channel different from a first channel on which said ad hoc network transmits and receives packets;

a time designation signal generating unit that generates time designation signal for designating switching time to the node apparatus for switching the channel used for transmission and reception of packets to said second channel;

a first radio communication unit that transmits said route control packet, said channel designation signal and said time designation signal on said first channel; and a channel switching unit that switches, when it is time to switch, the channel on which said first radio communication unit transmits and receives signal, to said second channel; and wherein said node apparatus comprises:

a second radio communication unit capable of switching the channel used for transmission and reception of packets;

a route control unit that receives and transmits through said second radio communication unit said route control packet transmitted through said ad hoc network to which said node apparatus belongs;

a designation information acquisition unit that acquires, from the channel designation signal and the time designation signal transmitted through said ad hoc network and received by said second radio communication unit, the designation of said second channel and said switching time;

a selection unit that select either one of said first gateway apparatus and a second gate way apparatus; and a channel control unit that switches, when said selection unit selects said second gateway apparatus and when it is time to switch, the channel used by said second radio communication unit for transmission and reception of signal to said second channel.

6. A channel switching method of node apparatuses that form an ad hoc network, said channel switching method comprising:

transmitting route control packets for route control, through the ad hoc network transmitting and receiving packets on a first channel, for constructing routes between a second gateway apparatus different from a first gateway apparatus connected to the ad hoc network and node apparatuses forming the ad hoc network;

transmitting, through said ad hoc network, a channel designation signal designating a second channel different from said first channel and a time designation signal designating channel switching time;

selecting, for each of node apparatuses receiving said route control packets, when it is time to switch, either one of said first gateway apparatus and said second gateway apparatus; and switching, when it is time to switch, the channel used by the node apparatus which has selected said second gateway apparatus for transmission and reception of packets to said second channel.

* * * * *